G. L. MARRS.
PARCEL CARRIER FOR MOTOR CYCLES.
APPLICATION FILED JUNE 3, 1913.
1,102,159.  Patented June 30, 1914.
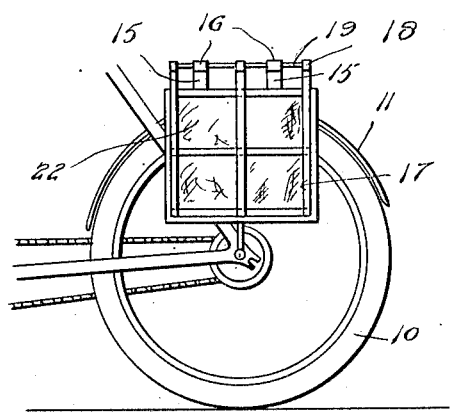
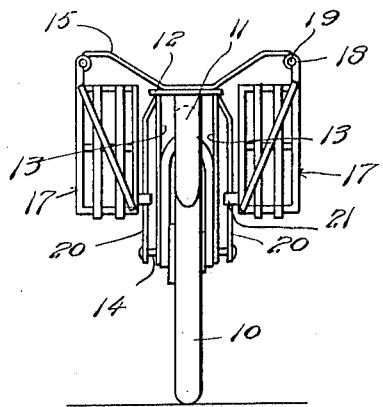
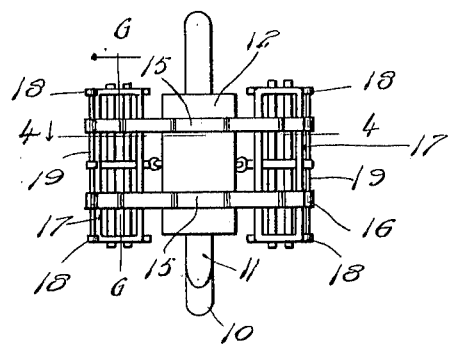
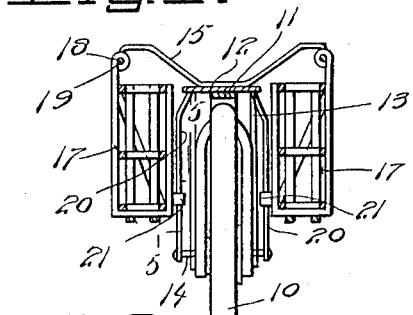
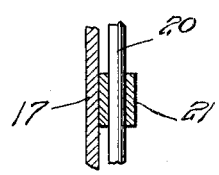
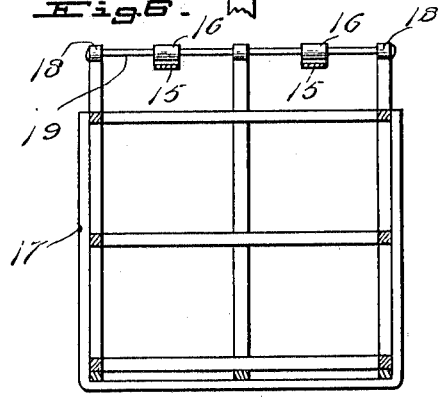
Inventor
G. L. Marrs.
Witnesses
Chas E. Kamper
Francis Boyle
By
Chandler Chandler
Attorney
COLUMBIA PLANOGRAPH CO., WASHINGTON, D. C.

UNITED STATES PATENT OFFICE.

GIFFORD L. MARRS, OF McCOYSBURG, INDIANA.

PARCEL-CARRIER FOR MOTOR-CYCLES.

1,102,159.  Specification of Letters Patent.  Patented June 30, 1914.

Application filed June 3, 1913. Serial No. 771,506.

*To all whom it may concern:*

Be it known that I, GIFFORD L. MARRS, a citizen of the United States, residing at McCoysburg, in the county of Jasper, State of Indiana, have invented certain new and useful Improvements in Parcel-Carriers for Motor-Cycles; and I do hereby declare the following to be a full, clear, and exact description of the invention, such as will enable others skilled in the art to which it appertains to make and use the same.

This invention relates to parcel carriers for motorcycles and has for an object to provide a device of this character that will be mounted in such a manner that its weight will be carried for the most part by the rear wheel of the motorcycle and will be so constructed as to present minimum surfaces and thus not retard the motorcycle as would be the case were considerable surfaces exposed to the breeze.

A still further object is to provide a parcel carrier including compartments on each side of the rear wheel, which compartments are supported at the tops by springs and are mounted for vertical sliding movement so that jars and shocks to the contents of the compartments will be reduced to a minimum.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a side elevation. Fig. 2 is a rear elevation. Fig. 3 is a plan. Fig. 4 is a cross sectional view on the line 4—4 Fig. 3. Fig. 5 is a vertical sectional view on the line 5—5 Fig. 4. Fig. 6 is a longitudinal sectional view on the line 6—6 Fig. 3.

Referring now to the drawing in which like characters of reference designate similar parts, 10 designates the rear wheel and 11 the rear wheel guard of an ordinary motorcycle, there being an ordinary platform 12 secured to the guard as usual to form the ordinary baggage carrier, this platform being secured by braces or uprights 13 to the spindle 14 of the rear wheel.

Secured to and extending transversely across the baggage carrier are leaf springs 15 which terminate in eyes 16. Arranged outside of the rear wheel are parcel carriers 17 each in the nature of a skeleton strap iron basket, the outer sides of each basket extending upwardly and being formed with eyes 18 which aline with the corresponding eyes 16 on the springs, and a pintle 19 is passed through the eyes of each basket and through the eyes of the springs to hingedly secure the baskets to the respective ends of the springs.

Upright guide rods 20 are secured to the ends of the rear wheel spindle and are secured to the baggage carrier 12, and guide eyes 21 carried upon the inner sides of the baskets loosely encircle these guide rods. As will be apparent, both baskets may yield vertically on the guide rods during vibration of the suspension springs 15 of the baskets when the motorcycle is passing over uneven roads, the springs serving to cushion the baskets against violent shocks whereby fragile articles may be carried therein without danger of breakage. Within each basket there is preferably disposed a leather or canvas bag 22 which may be collapsed flat upon the bottoms of the baskets when not in use so that windage is reduced. By virtue of the baskets being of skeleton construction, there are presented but minimum surfaces to the wind so that progress of the motorcycle is not impeded.

From the above description it will be seen that I have provided an extremely simple and durable package carrier for motorcycles, which carrier is formed of a few parts that are inexpensive in construction and will not easily get out of order.

What is claimed, is:—

1. A package carrier for motorcycles including a leaf spring, a pair of skeleton basket like receptacles having their outer sides hingedly suspended from the ends of said leaf spring, stationary vertical guide bars, and guide eyes carried by the inner sides of said receptacles encircling said guide bars.

2. The combination with a motorcycle of leaf springs secured above and extending transversely across the motorcycle rear wheel, upright stationary guide bars arranged on opposite sides of said rear wheel, a pair of baskets having their outer sides hingedly connected to the respective ends of said leaf springs and disposed with their inner sides in close proximity to the respective guide bars, and guide eyes carried by the inner sides of said baskets encircling said guide bars.

3. The combination with the rear guard and spindle of a motorcycle, of a pair of upwardly bowed leaf springs centrally secured to said guard, a pair of vertical rods secured to said spindle at the lower ends and to said guard at the upper ends, substantially oblong skeleton baskets on the outer sides of said rods, hinge pintles passed through respective eyes on the outer ends of said leaf springs and on the outer sides of said baskets, and guide eyes on the inner sides of said baskets loosely encircling said rods.

In testimony whereof, I affix my signature, in the presence of two witnesses.

GIFFORD L. MARRS.

Witnesses:
 FRANCIS HARRINGTON,
 JAMES CLARK.

Copies of this patent may be obtained for five cents each, by addressing the "Commissioner of Patents, Washington, D. C."